(12) United States Patent
Son et al.

(10) Patent No.: US 7,991,871 B2
(45) Date of Patent: Aug. 2, 2011

(54) RFID TAG FOR IP ADDRESS-BASED RFID SERVICE AND RFID SERVICE METHOD USING THE SAME

(75) Inventors: Myung-Hee Son, Daejon (KR);
Yong-Joon Lee, Daejon (KR);
Cheol-Sig Pyo, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/096,554

(22) PCT Filed: May 30, 2006

(86) PCT No.: PCT/KR2006/002064
§ 371 (c)(1),
(2), (4) Date: Jun. 6, 2008

(87) PCT Pub. No.: WO2007/066861
PCT Pub. Date: Jun. 14, 2007

(65) Prior Publication Data
US 2008/0301307 A1    Dec. 4, 2008

(30) Foreign Application Priority Data

Dec. 8, 2005 (KR) .......................... 10-2005-0119627

(51) Int. Cl.
*G06F 15/173* (2006.01)
*G06F 15/177* (2006.01)
(52) U.S. Cl. ........................................ 709/223; 709/220
(58) Field of Classification Search .................. 709/203, 709/217, 223, 238, 220
See application file for complete search history.

(56) References Cited

U.S. PATENT DOCUMENTS

| | | | |
|---|---|---|---|
| 6,177,860 B1 * | 1/2001 | Cromer et al. | 340/10.1 |
| 6,853,294 B1 | 2/2005 | Ramamurthy et al. | |
| 7,152,092 B2 * | 12/2006 | Beams et al. | 709/204 |
| 7,316,347 B2 * | 1/2008 | Poor | 235/375 |
| 2003/0026620 A1 * | 2/2003 | Gallivan | 399/24 |
| 2003/0233541 A1 * | 12/2003 | Fowler et al. | 713/155 |
| 2005/0104719 A1 | 5/2005 | Ramamurthy et al. | |
| 2005/0233772 A1 | 10/2005 | McDonnell | |
| 2005/0253722 A1 * | 11/2005 | Droms et al. | 340/572.1 |
| 2006/0151592 A1 * | 7/2006 | Poor | 235/375 |
| 2008/0022290 A1 * | 1/2008 | Ochiai et al. | 719/315 |

FOREIGN PATENT DOCUMENTS

EP    1085432 A2    3/2001

(Continued)

OTHER PUBLICATIONS

International Search Report for corresponding to PCT/KR2006/002064 dated Oct. 19, 2006.
European Search Report, Appln No. EP 06 76 8692, dated Sep. 27, 2010.

(Continued)

*Primary Examiner* — Hussein A Elchanti
(74) *Attorney, Agent, or Firm* — Kile Park Goekjian Reed & McManus PLLC

(57) ABSTRACT

Provided are a RFID tag and a method for providing a RFID service using the same. The RFID tag includes: a code type data denoting a code type of the RFID tag; and a content server IP address code denoting an IP address of a content server that provides content related to an item with the RFID tag attached.

6 Claims, 3 Drawing Sheets

FOREIGN PATENT DOCUMENTS

| | | |
|---|---|---|
| JP | 2002-150142 | 5/2002 |
| JP | 2002-324021 | 11/2002 |
| JP | 2003-076920 | 3/2003 |
| JP | 2003-223493 A | 8/2003 |
| JP | 2004-164180 A | 6/2004 |
| JP | 2005-038100 | 2/2005 |
| JP | 2005-107772 A | 4/2005 |
| JP | 2005-277723 A | 10/2005 |
| KR | 10-2005-0072184 | 7/2005 |
| KR | 10-2006-0064709 | 6/2006 |
| KR | 10-2006-0067035 | 6/2006 |

OTHER PUBLICATIONS

Tateoka Takamachi, "Trend and Problems of Logistics Using RFID Tags", IPSJ Magazine, vol. 44, No. 4, pp. 428, Apr. 15, 2003.

Japan Patent Office, Office Action, Appln No. 2008-544234, dated Nov. 19, 2010.

MyungHee Son et al., "Proposal of New Electronic Service Code (ESC) to Activate RFID Contents based Services on Network Aspects of Identification Including RFID (NRFID)", International Telecommunication Union—Telecommunication Standardization Sector, Feb. 16, 2006.

\* cited by examiner

[Fig. 1]
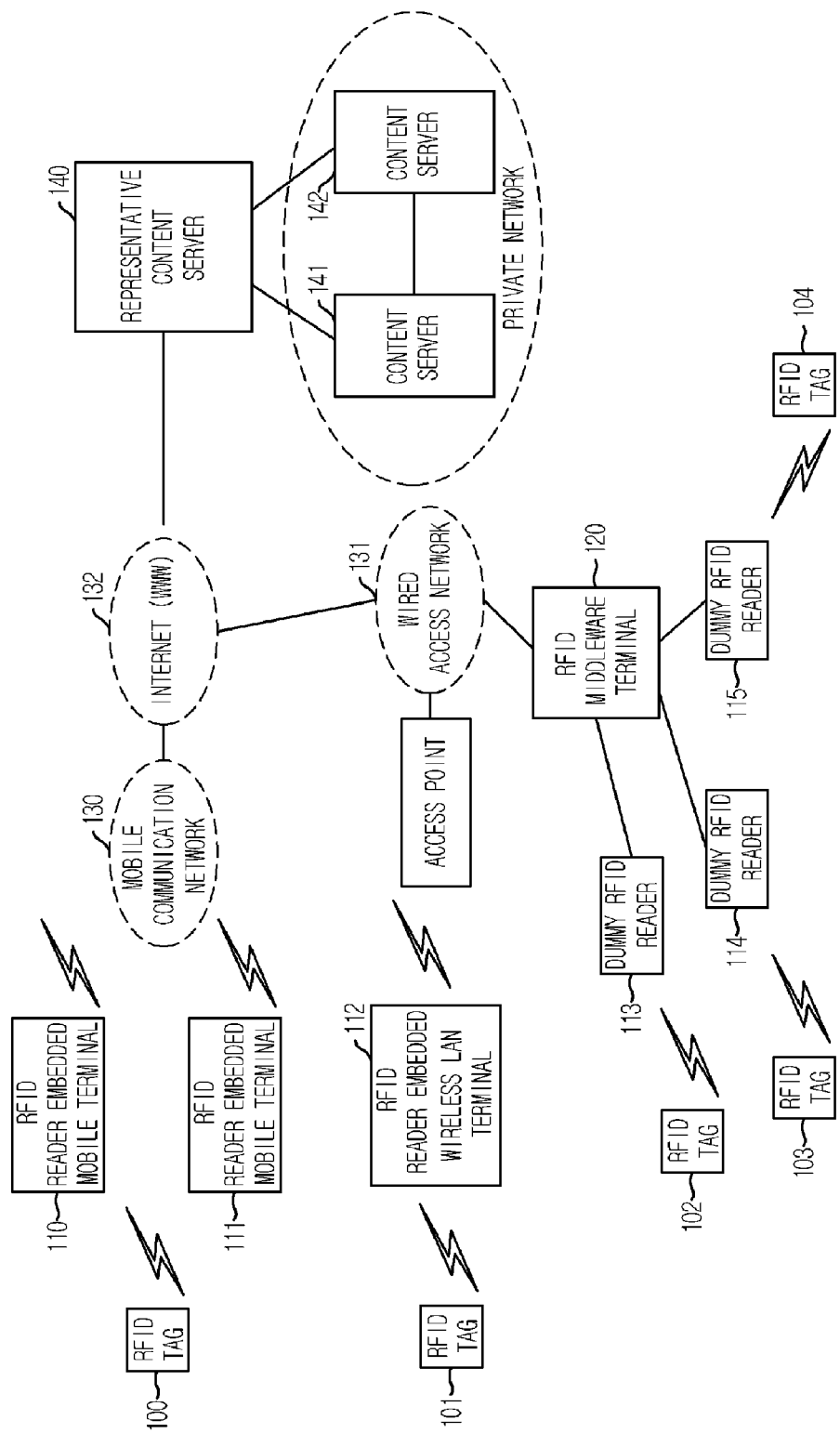

[Fig. 2]
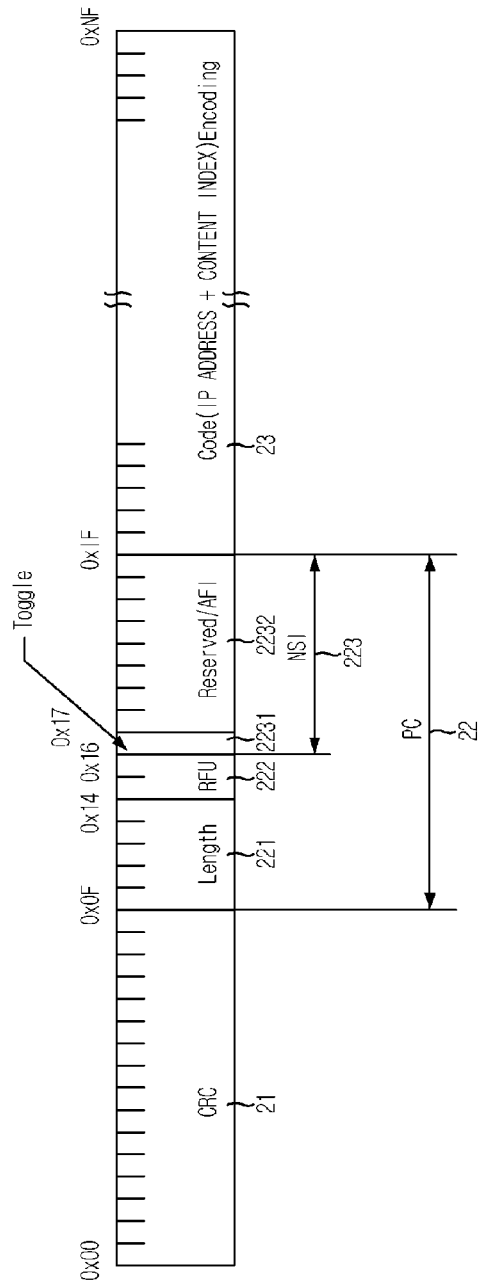
[Fig. 3]
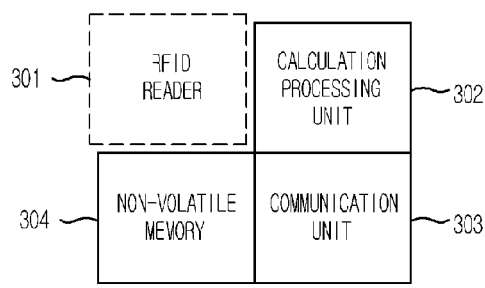

[Fig. 4]
[Fig. 5]
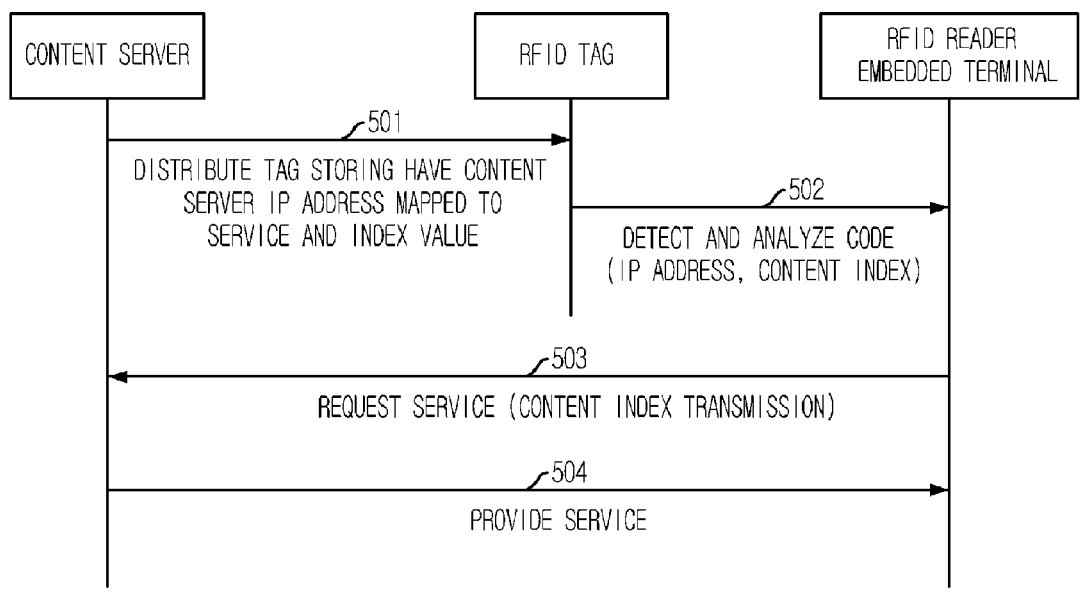

RFID TAG FOR IP ADDRESS-BASED RFID SERVICE AND RFID SERVICE METHOD USING THE SAME

TECHNICAL FIELD

The present invention relates to a radio frequency identification (RFID) tag for an Internet protocol (IP) based RFID service and a method for providing an IP based RFID service using the same in an RFID terminal or a content server; and more particularly, to an RFID tag for an IP based RFID service and an IP based RFID service method using the same for quickly and effectively receiving a content service and rapidly responding to service content variation using code information of a typical RFID tag to store an IP address of a content service that provides the contents or an IP address of a content service and a content index to provide the RFID service.

BACKGROUND ART

Conventional radio frequency identification (RFID) services relates to an RFID network architecture to distribute goods or to manage stocks for storing in a warehouse. RFID tags are attached at the goods and the stocks and contain a code that denotes information about the goods or the stocks. In order to communicate to a content server that provides related services, an RFID terminal must use an object name service server to find a location of the content service based on a recognized code. That is, the RFID terminal cannot directly access the content server using the code of the RFID tag. Such a conventional way of accessing the content server may produce a networking overhead to find the content server.

Therefore, there is a demand for developing a method for allowing an RFID terminal to directly access a content server only using a code of an RFID tag. Such a demand has been further growing because the conventional RFID service for the physical distribution or the management of stocks in the warehouse is evolved to provide content related services.

Although no conventional technology for directly connecting a terminal to an application on a network without analyzing a code was introduced, a related conventional technology was disclosed in U.S. Pat. No. 6,853,294 entitled "NETWORKING APPLICATIONS FOR AUTOMATED DATA COLLECTION" which introduces a structure of inter-working between a terminal and applications on the network. The conventional technology teaches a method allowing a fixed reader to directly communicate to an application server on a wired network. In the method, information about a port number and an IP address is stored in a data region of a tag in order to inter-work with applications of a related service when data is analyzed.

However, the conventional method still analyzes codes although the port number and the IP address are stored in the data region of the tag. In a tag created based on ISO/IEC 18000-6, a tag code memory and a data memory are identified by memory addresses. Therefore, the overhead is generated because the data memory must be read again when the tag is recognized. Also, the conventional method introduces a method of inter-working with application programs on the network. That is, the conventional method fails to teach an effective networking infra in a view of inter-networking in a general RFID technology.

DISCLOSURE OF INVENTION

Technical Problem

It is, therefore, an object of the present invention to provide an RFID tag for an IP based RFID service and an IP based RFID service method using the same for quickly and effectively providing a content service and rapidly responding to service content variation using code information of a typical RFID tag to store an IP address of a content server or an IP address of a content server and a content index to provide the RFID service.

Technical Solution

In accordance with one aspect of the present invention, there is provided a radio frequency identification (RFID) tag for an Internet protocol (IP) address based RFID service, the RFID tag including: a code type data denoting a code type of the RFID tag; and a content server IP address code denoting an IP address of a content server that provides content related to an item with the RFID tag attached.

In accordance with another aspect of the present invention, there is provided a method of providing an IP address based RFID service in an RFID terminal having an RFID reader, including the steps of: a) obtaining an IP address of a content server by recognizing and analyzing the RFID tag; b) requesting a content service to a content server based on the obtained content server IP address through a network; and c) receiving information related to the content service from the content server through the network and providing the received information to the user.

In accordance with still another aspect of the present invention, there is provided a method of providing an IP address based RFID service in a content server, including the steps of: a) receiving a content service request message with a content index from a user's RFID terminal; b) extracting a content index from the request message; and c) providing information related to a corresponding content service to the RFID terminal using the extracted content index.

A conventional RFID service was developed for physical distribution and a code is assigned based on a type of a good for the conventional RFID service so the codes are not dynamically changed. Therefore, it was possible to assign a code according to each service in the conventional RFID service model for physical distribution. However, it is very difficult to assign unique code to various services in a service based RFID service. That is, a code of an item is dynamically changed in the service based model.

In order to satisfy the demand of the service based model, the present invention introduces a method for providing an RFID service without analyzing a conventional code while flexibly responding to services that are dynamically varied.

In the present invention, a code of a tag recognized by a terminal having an RFID reader is used to store an IP address of a content server that provides an RFID service in order to utilize an IP address based RFID technology. That is, a complex structure for providing an e-business through a mobile RFID terminal can be simplified according to the present invention by storing location information of a server such as an IP address in a code memory.

Also, the present invention introduces a networking model suitable for a content based RFID service model since a physical distribution based RFID service transits to the content based RFID service model. That is, the present invention may be applied to an RFID based total service. Since the present invention stores an IP address in a code memory according to a code memory structure of a tag based on an ISO/IEC 18000-6 standard, a conventional method of recognizing a tag through an air-interface can be used without modification.

Advantageous Effects

A RFID tag according to the present invention is created for providing contents not for physical distribution and managing stocks in a warehouse. Therefore, a user is allowed to automatically receive a target service from a content server by directly accessing the content server by recognizing information stored in a code field of an RFID tag using an RFID reader.

That is, an RFID tag and a method of providing an RFID service using the same according to the present invention allow the user's RFID terminal having an RFID reader effectively receives a content service at anywhere and anytime. Therefore, the RFID tag according to the present invention includes an IP address of a content server that provides a corresponding service and a content index which is a record index of a content database (DB) in a corresponding content server. Therefore, additional services such as an object name service for tracing a location of an application server (content server) is not required. Furthermore, the RFID tag according to the present invention allows a new IP based RFID networking with high flexibility and expandability as well as quickly providing the service by directly inter-working with the content server.

A RFID tag and a method of providing an RFID service method using the same according to the present invention can immediately provide a new service without changing a legacy code structure in the RFID tag or without requesting additional code analyzing operation by updating information of a mapping table that is a content index if the content server changes a service. Therefore, a user may reduce a cost for a data communication in a wireless network environment.

A RFID tag and a method of providing an RFID service using the same according to the present invention dose not require a supplementary signaling or a routing mechanism for the RFID networking. Also, the user's RFID terminal is allowed to effectively access the content without code analyzing operation by storing an IP address of a content server and a content index in a code field of an RFID tag instead of storing a code for physical distribution.

A RFID tag and a method of providing an RFID service using the same according to the present invention provides an infra structure for providing an RFID service suitable for a content based RFID service model. Also, a networking overhead is minimized by directly accessing the content server using information stored in the code field of the RFID tag. Furthermore, the RFID tag and the method of providing an RFID service using the same according to the present invention maintains a conventional RFID code structure in order to cooperate with the conventional RFID infra without modification.

BRIEF DESCRIPTION OF THE DRAWINGS

The above and other objects and features of the present invention will become apparent from the following description of the preferred embodiments given in conjunction with the accompanying drawings, in which:

FIG. 1 is a block diagram illustrating an IP address based RFID network in accordance with a preferred embodiment of the present invention;

FIG. 2 is a diagram showing a tag memory map for storing an IP address of a content server in a code field of an RFID tag in accordance with a preferred embodiment of the present invention;

FIG. 3 is a block diagram illustrating an RFID terminal for providing an IP based RFID service in accordance with a preferred embodiment of the present invention;

FIG. 4 is a block diagram showing a data based schema record managed by a content service in accordance with a preferred embodiment of the present invention; and FIG. 5 is a flowchart showing a method for providing an IP address based RFID service in accordance with a preferred embodiment of the present invention.

MODE FOR THE INVENTION

Other objects and aspects of the invention will become apparent from the following description of the embodiments with reference to the accompanying drawings, which is set forth hereinafter.

FIG. 1 is a block diagram illustrating an IP address based a radio frequency identification (RFID) network in accordance with a preferred embodiment of the present invention.

In the present invention, a service item may be classified into two items, a physical item and an electronic item, in a view of an electronic business.

The physical item is an item directly delivered to a user when the user requests a related service. That is, the physical item is goods or stocks delivered to a user as a result of using a service for purchasing goods.

The electronic item denotes an item electrically existed as a result of electronic business when a user requests the related service. That is, the electronic item may be an electronic ticket for reserving a seat for a movie theater.

In order to utilize the RFID tag and the method of providing the RFID service according to the present invention, an RFID network infra that is an IP address based RFID service network may be configured as shown in FIG. 1.

The IP address based RFID service network includes RFID tags 100 to 104, an RFID reader embedded mobile terminal 110 capable of computation, a wireless LAN terminal 112, dummy RFID readers 113 to 115 not capable of computation, an RFID middleware 120 having a computational function for the dummy RFID reader, and content servers 140 to 142. Hereinafter, an RFID terminal denotes the mobile terminals 110 and 111 with the RFID reader embedded, the RFID reader embedded wireless LAN terminal 112 and the RFID middleware terminal (system) 120.

The RFID terminal communicates with the RFID tag through an air-interface, and the RFID reader terminal and the content server are connected to the Internet 132 through a mobile communication network 130 and the wired access network 131.

The RFID tags 100 to 104 are attached to the physical item or the electronic item, and the information about the physical item and the electronic item are stored in the content servers 140 to 142 that are connected to the Internet.

The content servers 140 to 142 are connected each others though a private network. In this case, a representative content server 140 is connected to the Internet. The RFID service is provided through the network configuration shown in FIG. 1 for improving expandability and flexibility.

The representative content server 140 is capable of issuing codes including services, and lower-level content servers 141 and 142 provide services only. The present invention relates to a method of mapping a code of an RFID tag to a related service provided from a content server based on the network configuration shown in FIG. 1.

FIG. 2 is a diagram showing a tag memory map for storing an IP address in accordance with a preferred embodiment of the present invention. That is, FIG. 2 shows a code memory map of an RFID tag to store an IP address in an ISO/IEC 18000-6 tag or a Gen 2 tag.

The code memory map defined in the ISO/IEC 18000-6 standard includes a cyclic redundancy checking (CRC) field 21, a protocol control (PC) field 22 and a code field 23. Herein, the PC field 22 is configured of a code length field 21, a reserved for further use (RFU) field 222 and a numbering system identifier (NSI) field 223. The NSI 223 is configured of a toggle bit 2231 and a reserved/application family identifier in the ISO 15961 (AFT) 2332.

The CRC field 21 is used for checking an error when the tag data is exchanged through an air-interface. The middleware of mobile RFID reader receives a 16-bit RC field 22 and an encoded code value of the code field 23 for computational process.

If the PC field is 16 bits, a 5-bit length field 221 denotes a length of an encoded code and a length of the encoded code is defined to be times of 16 bits. Since an address of Internet protocol version 4 (IPv4) and Internet protocol version 6 (IPv6) requires a memory space as much as times of 16-bits, the code map according to the present invention shown in FIG. 2 can be used without modification.

The 2-bit RFU field 222 is not used in a current ISO/IEC 18000-6 standard. That is, the 2-bit RFU field 222 contains a value of zero (0) according to a current version of UHF class 1 generation 2 tag protocol specification. In the present invention, the RFU field is used to store an IP address of a content server. If the value of the RFU field is '01' in a binary number, the encoded value in the code field denotes an IPv4 address. If the value of the RFU field is '10' in a binary number, the encoded value in the code field denotes an IPv6 address. The toggle bit 131 and the 8-bit Reserved/AFI 132 are defined according to the conventional specification. Herein, the toggle bit 131 always has a value of zero (0) for an IP address.

Hereinafter, encoding of an IP address in a code of an RFID tag according to the present invention will be described.

It is very inconvenience to input data to a mobile terminal using a key-pad to use a wireless Internet service. In order to allow a user to easily use the wireless Internet service using single button, an RFID service technology was introduced. In the RFID service technology, a service provider attaches an RFID tag on an electronic or a physical item and a related service is provided to a user based on the attached RFID tag.

Such an RFID service technology was mainly developed to manage items for distributing and storing, and the code of the RFID tag was used to identify items. However, a code of an RFID tag must be used for other purpose in order to provide an RFID service for e-business in a wireless Internet environment through a mobile terminal with an RFID reader embedded.

If a code memory structure of an RFID tag is newly defined, the comparability problem may arise. Therefore, a conventional code encoding scheme is used without modification in the present invention.

According to the present invention, a content server creates a code 23 to include an IP address of the content server itself and a content index for informing a location of related information in a database in the content server in order to provide a related service. Herein, the content server stores the IP address in the tag in a format supporting both of a 32-bit IPv4 address and 128-bit IPv6 address.

FIG. 3 is a block diagram illustrating an RFID terminal for providing an IP based RFID service in accordance with a preferred embodiment of the present invention. Herein, an RFID terminal denotes an RFID middleware terminal 120 capable of recognizing and processing an RFID tag or RFID reader embedded terminals 110 to 112 capable of middleware functions.

As shown, the RFID terminal according to the present invention includes an RFID reader 301, a processing unit 302, a non-volatile memory 304 and a communication unit 303. Theses RFID terminals have a same basic configuration regardless of whether the middleware is embedded or not. If the RFID terminal does not include the middleware, a dummy RFID reader is mapped to the RFID reader 301. The terminal having the middleware for an RFID reader may be a mobile phone, a personal data assistant (PDA) and a notebook having the middleware.

The RFID reader 301 communicates to the RFID tag. The processing unit 302 determines a type of recognized code information of the RFID tag. The non-volatile memory 304 stores an electronic code transmitted from a content server to an RFID terminal for authenticating a purchase or a delivery in an RFID service. The communication unit 303 performs operations for exchanging data between the mobile terminal and the content server.

FIG. 4 is a block diagram showing a data based schema record managed in a content service in accordance with a preferred embodiment of the present invention.

As a part of code value stored in a code memory in an RFID tag, a schema recode denotes an index value 401 to find information related a target service or content 402 stored in the content server. Herein, the information related the target service may be a service that can be immediately provided from a representative content server or may be information related to a uniform resource identifier (URI) of a corresponding server to obtain service information.

FIG. 5 is a flowchart showing a method of an IP address based RFID service in accordance with a preferred embodiment of the present invention.

The content server creates an RFID tag storing a code configured of an IP address of the content server itself and a content index in order to provide various RFID services. Such a created RFID tag is distributed by being attached on an advertisement banner paper at step S501. Herein, the IP address of the content server and the content index are stored in the code field of the RFID tag with related information about a code type. That is, an RFID service is published and advertised through distributing the advertisement banner papers with the RFID tag attached.

A user's RFID terminal reads an RFID tag and recognizes a code and a code type in the code field of the RFID tag through the RFID reader. Herein, the RFID terminal may be an RFID middleware terminal having a dummy RFID reader. Then, the RFID terminal obtains the IP address of the content server and the content index through decoding the code value of the code field according to the recognized code type at step S502.

That is, the user's RFID terminal recognizes the code type based on the value of the RFU field in the RFID tag, analyzes the code of the code field according to the recognized code type and obtains the IP address of the content server and the content index. The RFID terminal may obtain only the content server's IP address if the content server creates the RFID tag with the IP address stored in the code only.

Then, the RFID terminal requests the RFID service to a corresponding content server using the IP address at step S503. Herein, if the RFID terminal obtains the content index at step S502, the RFID terminal transmits the obtained content index when requesting the RFID service.

If the content server receives the request of the RFID service from the RFID terminal, the content server provides information related to the requested service to the RFID terminal at step S504. If the content server receives the content index, the content server also transmits the information related to the received content index to the RFID terminal. A user may order a target item to the content server using the service related information.

Hereinafter, the authentication step related to the RFID service according to the present invention will be described.

If the RFID terminal requests a service for a physical item that must be delivered, the content server creates a new RFID tag by storing an IP address of a server that processes a delivery operation of the request physical item and an identification number of corresponding service that may be a content index in the code field. Herein, the IP address of the deliver server includes in a format supporting both of the IPv4 address and the IPv6 address.

The created new RFID tag is attached to a box of the physical item and the box with the physical item is delivered to the user who requests the corresponding service. Also, the content server transmits the information stored in the RFID tag to the user's RFID terminal through the network. Then, the user's RFID terminal receives and stores the transmitted information in the non-volatile memory 304.

When the user receives the box with the physical item, the RFID tag attached on the box is scanned using the RFID terminal to recognize the information stored in the RFID tag. Then, a delivery authentication is performed by comparing the scanned information and the received information. That is, the IP address of the delivery server and the service identification number stored in the scanned information are compared to those stored in the received information to authenticate the delivery.

Meanwhile, an authentication process for electronic item is classified into a content server based authentication process and an RFID mobile terminal based authentication process.

At first, the content server based authentication process will be described.

The content server issues an electronic ticket that is a right of a request service and transmits the issued electronic ticket to the user's RFID terminal. The transmitted information is stored in the RFID terminal's tag.

When the user with the RFID terminal storing the electronic item that is the electronic ticket passes a gate of a service providing place such as a movie theater, an RFID terminal for authentication which installed at the gate reads the tag of the user's RFID terminal which stores the information related to the electronic ticket. Then, the RFID terminal for authentication transmits the recognized tag information to the content server.

The content server checks whether the user has a right of using the related service based on the tag information transmitted from the RFID terminal for authentication. Then, the checking result is transmitted to the RFID terminal for authentication.

The RFID terminal based authentication process will be described, hereinafter.

After a user receives an electronic item as a result of e-business by communicating with a related content server, the user's RFID terminal receives the electronic item and stores it in the non-volatile memory 304.

The user scans an RFID tag provided from a service provider using the user's RFID terminal in order to obtain authentication information when the user passes the service providing place.

The user's RFID terminal performs operations for the service authentication of the electronic item stored in the non-volatile memory 304 using the obtained authentication information from the RFID tag.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean patent application No. 2005-0119627, filed in the Korean Intellectual Property Office on Dec. 8, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A radio frequency identification (RFID) system for an Internet protocol (IP) address based RFID service, the RFID system comprising:

a content server for creating an RFID tag, which is attached to an item, and a content related to the item corresponding to an RFID service in order to provide the RFID service by using the RFID tag as an IP address of the content server; and an RFID terminal for being provided the RFID service from the content server by using the RFID tag;

wherein the RFID tag stores a code denoting the IP address of the content server, a code denoting a content index, and a code type information denoting a code type of codes stored in the RFID tag;

wherein the RFID terminal reads the RFID tag, recognizes the code type and the codes stored in the RFID tag, decodes the codes stored in the RFID tag based on the code type, obtains the IP address of the content server and the content index, and is provided the RFID service by using the IP address of the content server and the content index;

wherein the RFID tag includes a tag memory map and a code memory map;

wherein the code memory map includes a cyclic redundancy checking (CRC) field, a protocol control (PC) field, and a code field;

wherein the PC field includes a reserved for further use (RFU) field; and wherein the RFU field is used to store the IP address of the content server.

2. The RFID system as recited in claim 1, wherein the content index denotes an identification information of the content related to the item.

3. The RFID system as recited in claim 2, wherein the IP address of the content server and the content index are stored in the code field of the RFID tag, when the RFID tag is a tag created based on ISO/IEC 18000-6.

4. The RFID system as recited in claim 3, wherein the IP address of the content server includes an IPv4 address and an IPv6 address.

5. The RFID system as recited in claim 4, wherein the content index is at least one of an item, a service, and a uniform resource identifier (URI).

6. The RFID system as recited in claim 4, wherein the code type information is stored in the RFU field, and denotes one of the IPv4 address and the IPv6 address.

* * * * *